United States Patent [11] 3,622,636

| [72] | Inventors | Heinrich Krimm<br>Krefeld-Bockum;<br>Hans-Josef Buysch, Krefeld-Bockum;<br>Hermann Schnell, Krefeld-Uerdingen, all of Germany |
|---|---|---|
| [21] | Appl. No. | 732,511 |
| [22] | Filed | May 28, 1968 |
| [45] | Patented | Nov. 23, 1971 |
| [73] | Assignee | Farbenfabriken Bayer Aktiengesellschaft<br>Leverkusen, Germany |
| [32] | Priority | July 1, 1967 |
| [33] | | Germany |
| [31] | | F 52840 |

[54] M- AND P-ISOPROPENYLPHENYL-DIMETHYLCARBINOL
1 Claim, No Drawings

[52] U.S. Cl. .................................................. 260/618, 260/999, 260/606, 252/8.5

[51] Int. Cl. .................................................... C07c 33/06
[50] Field of Search ........................................... 260/618, 618 R

[56] References Cited
FOREIGN PATENTS
968,209  4/1950  France ........................ 260/610 B

*Primary Examiner*—Bernard Helfin
*Attorney*—Connolly and Hutz

ABSTRACT: Meta and para-isopropenylphenyl-dimethylcarbinols and a process for producing them by partial catalytic dehydration of the corresponding meta or para-bis-carbinol, or by recovery of the desired product in statu nascendi by specific extraction or distillation thereof.

M- AND P-ISOPROPENYLPHENYL-DIMETHYLCARBINOL

The object of the invention comprises m- and p-isopropenylphenyl-dimethylcarbinol of the formula

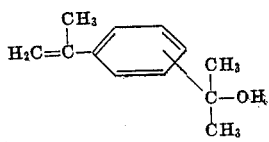

and a process for the production thereof.

The m-isopropenylphenyl-dimethylcarbinol forms colorless crystals of melting point 44°–45° C., (boiling point 72°–74° C./0.2 mm. Hg); the p-isopropenylphenyl-dimethylcarbnol forms colorless crystals of melting point 40°–41° C. (boiling point 78°–80° C./0.3 mm. Hg).

Since these isopropenylphenyl-dimethylcarbinols have a reactive double bond as well as a reactive hydroxyl group, they are valuable intermediates for the production of organic compounds, particularly of synthetic materials. Moreover, they can be used as disinfectants, as they decompose with the elimination of formaldehyde when stored in air. They are also useful as preserving additives to technical oils such as, for example, drilling oils, and to technical dispersions, for example, aqueous dispersions of mineral oils and of pigments and dyestuffs and to sewages of paper factories for preventing rottenness.

The process for the production of these isopropenylphenyl-dimethylcarbinols consists in subjecting the corresponding biscarbinol to known dehydration conditions, but terminating the action of these conditions on the reaction material, depending on their effectiveness, after achieving a more or less high partial conversion, or on the isopropenylphenyl-dimethylcarbinol in statu nascendi by extracting it or distilling it off.

This process is based on the observation that by the action of dehydrating conditions on biscarbinols only one of the two carbinol groups is initially dehydrated, that is to say that isopropenylphenyl-dimethylcarbinol is primarily formed, and that it is possible under the aforesaid conditions to collect and isolate this primary product before dehydration of the second carbinol group occurs to a marked extent and diisopropenylbenzene is quantitatively formed, or even polymerisation of one or the other reaction product sets in.

The term dehydration conditions is to be understood to mean the action of dehydration catalysts on the biscarbinol concerned, possibly at elevated temperatures.

Known dehydration catalysts are, for example, more or less diluted strong mineral acids, such as sulfuric acid, hydrochloric acid, perchloric acid, phosphoric acid, which are effective already at room temperature or slightly elevated temperature; furthermore acidic salts, such as acidic sodium and potassium sulfate and zinc chloride; organic acids, such as benzene- and toluene-sulfonic acids, nitrobenzoic acids, picric acid; acidic earths, such as aluminum oxide, or earths treated with acid, e.g., Fuller's earth or bentonite (see German Published Specification No. 1,186,047 and Am.Chem.Soc. 41(1919), page 1682). There may also be mentioned weak organic acids, such as acetic acid, lactic acid, citric acid, tartaric acid, salicylic acid, stearic acid, benzoic acid, adipic acid and phthalic acid (see German Pat. Spec. No. 1,025,864). Particularly mild catalysts are ammonium salts, amides, imides and esters of organic acids, isocyanates and carbodiimides.

Whereas catalysts of the type mentioned above are added to the biscarbinol, it is also possible to bring the biscarbinol in contact with solid catalysts, such as γ- aluminum oxide, silica, aluminum phosphate, boron phosphate and sodium phosphate, which have been heated to elevated temperatures (see British Pat. Spec. No. 846,616). The passing of biscarbinol vapor over pumice at elevated temperatures has proved to be a particularly suitable process using a solid catalyst.

Termination of the action of the dehydration conditions on the reaction material after achieving the desired partial conversion can be carried out in most cases by cooling, possibly also by diluting and/or neutralizing the catalyst. In the case where biscarbinol vapor is passed over a solid catalyst, e.g., pumice, the partial conversion is achieved by a more or less high load on the catalyst.

If the isopropenylphenyl-dimethylcarbinol is to be collected in statu nascendi by extraction, the process is carried out in the presence of a water-immiscible solvent which readily dissolves the reaction product but hardly, or not at all, dissolves the biscarbinol and does not dissolve the catalyst. Such solvents include, for example, aliphatic, cycloaliphatic, araliphatic and aromatic hydrocarbons which may be substituted by halogen, for example, petroleum ether, benzine, cyclohexane, alkylcyclohexanes, tetrahydronaphthalene, benzene, toluene, xylene, cumol, diisopropylbenzene, methylene chloride, carbon tetrachloride, chlorocyclohexane, chlorobenzene and bromobenzene.

In this way it is possible, with the use of mild catalyst, to achieve a high conversion of dicarbinol and quite substantial yields of isopropenylphenyl-dimethylcarbinol.

On the other hand, it is also possible, with the use of mild catalysts, to distill off the isopropenylphenyl- dimethylcarbinol in statu nascendi particularly with the use of reduced pressure.

The following examples 1 to 7 give methods of carrying out the process, where the action of the dehydration conditions is terminated after achieving a partial conversion.

EXAMPLE 1

A mixture of 400 g. p-phenylene-bis-(dimethylcarbinol) and 2 litres of 10 percent aqueous acetic acid is heated in a nitrogen atmosphere with stirring and under reflux. After about three-fourth hours, the biscarbinol has dissolved and two liquid phases have formed. Boiling is terminated and the two phases are separated while still hot. The organic phase is shaken with a dilute sodium hydroxide solution and then mixed with about 1 litre of petroleum either. 179 g. of unreacted biscarbinol crystallize upon cooling. They are filtered off. After evaporation of the petroleum ether from the solution, there remain 185 g. of a residue which consists of 93.7 percent by weight p-isopropenylphenyl-dimethylcarbinol, 4.4 percent by weight p-diisopropenylbenzene and 1.8 percent by weight of unreacted biscarbinol. This mixture is separated into its components by fractional distillation. Conversion of biscarbinol: 55 percent. Yield of p-isopropenylphenyl-dimethylcarbinol: 86 percent of theory, referred to converted biscarbinol. Melting point 40°–41° C., boiling point 78°–80° C./0.3 mm. Hg. ps

| Analysis: | Calc. | Found | Iodine Number according to Brace | |
|---|---|---|---|---|
| | | | found | calc. |
| C | 81.77 | 81.5 | | |
| H | 9.15 | 9.38 | 153 | 144 |
| O | 9.08 | 8.98 | | |

EXAMPLE 2

The experiment is repeated according to Example 1, but boiling under reflux is extended to 1 ¼ hours. 141 g. of unreacted biscarbinol crystallize from the petroleum ether solution.

221 g. of residue, consisting of 90.4 percent by weight p-isopropenylphenyl-dimethylcarbinol, 7.4 percent by weight p-diisopropenylbenzene and 2.2 percent by weight of unreacted biscarbinol. Conversion of biscarbinol: 65 percent.

Yield of p-isopropenylphenyl-dimethylcarbinol: 86 percent of theory, referred to converted biscarbinol.

EXAMPLE 3

The experiment is repeated according to example 1, but the 2 litres of aqueous acetic acid are replaced with 2 litres of a 10 percent aqueous adipic acid solution and the mixture is boiled under reflux for 3 hours. Unreacted biscarbinol: 280 g.

neutralized the petroleum ether solution: 109 g. consisting of 89.5 percent by weight p-isopropenylphenyl-dimethylcarbinol, 8.3 percent by weight p-diisopropenylbenzene and 2.3 percent by weight of unreacted biscarbinol. Conversion of biscarbinol: 30 percent. Yield of p-isopropenylphenal-dimethylcarbinol: 90 percent of theory, referred to converted biscarbinol.

EXAMPLE 4

The process is carried out as described in example 1, but the 2 litres of diluted acetic acid are replaced with 400 ml. glacial acetic acid and boiling under reflux is terminated after 1 hour. The reaction solution is then poured into water, the aqueous phase is neutralized with a sodium hydroxide solution, and the organic phase is separated, if necessary, with the aid of petroleum ether.

There are obtained 339 g. of a mixture consisting of 49 percent p-diisopropenylbenzene, 48 percent p-isopropenylphenyl-dimethylcarbinol and unreacted biscarbinol.
Conversion of biscarbinol: 97 percent.
Yield of p-isopropenylphenyl-dimethylcarbinol: 46 percent of theory, referred to converted biscarbinol.

EXAMPLE 5

The experiment is repeated according to example 4, but with the use of m-phenylene-bis-(dimethylcarbinol).
Conversion of biscarbinol: 66 percent.
Yield of m-isopropenylphenyl-dimethylcarbinol: 71 percent of theory, referred to converted biscarbinol.
Melting point 44°–45° C., boiling point 72°–74° C./0.2 mm. Hg.

| Analysis | Calc. | Found | Iodine Number according to Braee | |
| --- | --- | --- | --- | --- |
| | | | found | calc. |
| C | 81.77 | 82.2 | | |
| H | 9.15 | 9.03 | 161 | 144 |
| O | 9.08 | 9.37 | | |

EXAMPLE 6

A mixture of 50 g. p-biscarbinol and 100 g. benzamide is heated under nitrogen at 170°–180° C. for 3 hours. The mixture is then cooled, the melt cake is comminuted and extracted with petroleum ether.
Conversion of biscarbinol: 42 percent
Yield of p-isopropenylphenyl-dimethylcarbinol: 80 percent of theory, referred to converted biscarbinol.

EXAMPLE 7

Evaporated p-biscarbinol is passed at a rate of 100 g./hour under normal pressure and at about 350° C. over 250 g. of granulated pumice. The escaping vapors are condensed. The condensate consists of about 20 percent by weight of unreacted biscarbinol, 38 percent by weight p-isopropenylphenyl-dimethylcarbinol and 42 percent by weight p-diisopropenylbenzene.
Conversion of biscarbinol: 80 percent
Yield of p-isopropenylphenyl-dimethylcarbinol: 47 percent of theory, referred to converted biscarbinol.

The following examples 8–11 give methods of carrying out the process, where the action of the dehydration conditions on the isopropenylphenyl-dimethylcarbinol in statu nascendi is terminated by extraction, due to the presence of a selective solvent.

EXAMPLE 8

A mixture of 100 g. p-biscarbinol, 200 ml. of 10 percent phosphoric acid and 200 ml. of light petrol (boiling point 110° to 120° C.) is heated under reflux in a nitrogen atmosphere for 1 hour while stirring. Boiling is then terminated, the aqueous phase is separated from the organic phase and the organic solution is concentrated by evaporation. There are obtained 90.2 g. of a residue which consists of 92 percent by weight p-isopropenylphenyl-dimethylcarbinol, 6.3 percent by weight p-diisopropenylbenzene and 1.7 percent by weight of unreacted biscarbinol.
Conversion of biscarbinol: 98 percent.
Yield of p-isopropenylphenyl-dimethylcarbinol: 92 percent of theory, referred to converted biscarbinol.

EXAMPLE 9

The experiment is repeated according to example 8, but the p-biscarbinol is replaced with m-biscarbinol. There are obtained 92 g. of a residue which consists of 79 percent by weight m-isopropenylphenyl-dimethylcarbinol, 11 percent by weight m-diisopropenylbenzene and 10 percent by weight of unreacted biscarbinol.

Conversion of biscarbinol: 90 percent
Yield of m-isopropenylphenyl-dimethylcarbinol: 88 percent of theory, referred to converted biscarbinol.

EXAMPLE 10

A mixture of 50 g. p-biscarbinol, 80 g. formamide and 100 ml. decahydronaphthalene is heated in a nitrogen atmosphere at 140°–150° C. for 1 hour while stirring. After cooling, the mixture is poured into water, filtered off from the crystallized unreacted biscarbinol (2.6 g.) and the phases are separated. According to analysis of the organic solution by gas chromatography, there have been formed 83 percent of the theoretical amount of p-isopropenylphenyl-dimethylcarbinol, referred to converted biscarbinol.

EXAMPLE 11

The experiment is repeated according to example 10, but the m-biscarbinol is reacted with 80 g. ammonium acetate for 2 hours at 130° C. 20.3 g. m-biscarbinol are recovered. According to analysis by gas chromatography, the yield of m-isopropenylphenyl-dimethylcarbinol amounts to 88 percent of theory, referred to converted biscarbinol.

The following examples 12 and 13 describe methods of carrying out the process where the action of the dehydration conditions on the isopropenylphenyl-dimethylcarbinol is terminated in statu nascendi by distilling off the product from the reaction mixture.

EXAMPLE 12

A mixture of 50 g. p-biscarbinol and 2 g. sebacic acid is heated under a pressure of 102 mm. Hg. in a distillation apparatus with a short column. At a sump temperature of about 200° C. the water and the reaction product begin to distill over and the head temperature rises to 180° to 185° C.

47.8 g. of distillation product and 3.5 g. of distillation residue are obtained. The dry distillation product weights 42.0 g. It contains 64 percent by weight p-isopropenylphenyl-dimethylcarbinol, 15 percent by weight p-diisopropenylbenzene and 21 percent by weight of unreacted biscarbinol.
Conversion of discarbinol: 78 percent
Yield of p-isopropenylphenyl-dimethylcarbinol: 75 percent of theory, referred to converted biscarbinol.

EXAMPLE 13

A mixture of 50 g. p-biscarbinol and 60 g. diphenyl carbonate is heated under a pressure of 50 mm. Hg. to a bath temperature of 170°–175° C., whereupon a mixture of p-isopropenylphenyl-dimethylcarbinol, unreacted biscarbinol and phenol distills over. The distillate is taken up with a sodium hydroxide solution and petroleum ether. When concentrated by evaporation, the petroleum ether solution gives 30 g. of a residue, 75 percent by weight of which consist of p- isopropenylphenyl-dimethylcarbinol. The distillation residue of 31 g. still contains starting materials
Conversion of biscarbinol: 65 percent.

Yield of p-isopropenylphenyl-dimethylcarbinol: 77 percent of theory, referred to converted biscarbinol.

We claim:

1. A compound of the formula

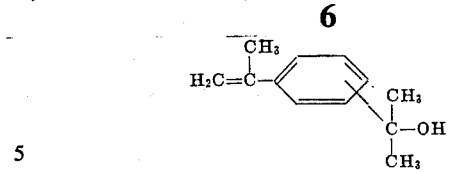

wherein the substituent groups on the phenyl ring are in meta or para relationship.